United States Patent
Lashley et al.

(10) Patent No.: US 7,457,796 B2
(45) Date of Patent: Nov. 25, 2008

(54) METHOD USING VIRTUAL REPLICATED TABLES IN A CLUSTER DATABASE MANAGEMENT SYSTEM

(75) Inventors: Scott David Lashley, Portland, OR (US); Paul Sherwood Taylor, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 10/886,997

(22) Filed: Jul. 8, 2004

(65) Prior Publication Data

US 2006/0010170 A1    Jan. 12, 2006

(51) Int. Cl.
*G06F 17/30* (2006.01)
*G06F 7/00* (2006.01)
(52) U.S. Cl. ............................................ 707/2; 707/10
(58) Field of Classification Search ................ None
See application file for complete search history.

(56) References Cited

U.S. PATENT DOCUMENTS

| | | | | |
|---|---|---|---|---|
| 5,222,217 A * | 6/1993 | Blount et al. ............... 707/204 |
| 5,815,649 A * | 9/1998 | Utter et al. ...................... 714/6 |
| 6,115,790 A * | 9/2000 | Schimmel ................... 711/119 |
| 6,182,282 B1 | 1/2001 | Stoodley et al. ................ 717/5 |
| 6,233,668 B1 | 5/2001 | Harvey et al. ............... 711/206 |
| 6,321,238 B1 * | 11/2001 | Putzolu ....................... 707/205 |
| 6,341,340 B1 * | 1/2002 | Tsukerman et al. ......... 711/150 |
| 6,529,906 B1 * | 3/2003 | Chan .............................. 707/8 |
| 6,542,926 B2 * | 4/2003 | Zalewski et al. ............ 709/213 |
| 6,625,593 B1 | 9/2003 | Leung et al. .................... 707/2 |
| 6,643,711 B2 | 11/2003 | Bracha et al. ............... 709/315 |
| 6,711,571 B2 * | 3/2004 | Putzolu .......................... 707/9 |
| 6,741,997 B1 * | 5/2004 | Liu et al. ..................... 707/102 |
| 7,107,270 B2 * | 9/2006 | Putzolu .......................... 707/9 |
| 7,120,651 B2 * | 10/2006 | Bamford et al. ............. 707/201 |
| 7,139,772 B2 * | 11/2006 | Bamford et al. ............. 707/102 |
| 7,277,897 B2 * | 10/2007 | Bamford et al. ......... 707/103 X |
| 2001/0029502 A1 | 10/2001 | Oeda ........................... 707/10 |
| 2002/0038437 A1 | 3/2002 | Hogdal et al. ................. 714/25 |
| 2002/0052914 A1 * | 5/2002 | Zalewski et al. ............ 709/203 |
| 2002/0138628 A1 | 9/2002 | Tingley et al. .............. 709/227 |
| 2002/0174142 A1 | 11/2002 | Demers et al. .............. 707/509 |
| 2003/0018876 A1 | 1/2003 | Zahir et al. ................. 711/206 |
| 2003/0158868 A1 | 8/2003 | Zoltan ........................ 707/201 |
| 2003/0182319 A1 | 9/2003 | Morrison .................... 707/200 |

(Continued)

OTHER PUBLICATIONS

Li, K. and P. Hudak "Memory Coherence in Shared Virtual Memory Systems", ACM Transactions on Computer Systems, vol. 7, No. 4, Nov. 1989, pp. 321-359.*

(Continued)

*Primary Examiner*—Luke S Wassum
(74) *Attorney, Agent, or Firm*—Kunzler & McKenzie (57) ABSTRACT

A method for improved data sharing within a cluster of nodes having a database management system. The method defines a virtual replicated table as being useable in a hybrid of a shared-cache and shared-nothing architecture. The virtual replicated table is a physically single table sharable among a plurality of cluster nodes for data read operations and not sharable with other cluster nodes for data modification operations. Default owner node is assigned for each virtual replicated table to ensure the page validity and provide requested pages to the requesting node.

6 Claims, 8 Drawing Sheets

U.S. PATENT DOCUMENTS

| | | | | |
|---|---|---|---|---|
| 2004/0030731 | A1 | 2/2004 | Iftode et al. | 707/205 |
| 2004/0030739 | A1 | 2/2004 | Yousefi'zadeh | 709/201 |
| 2004/0133538 | A1* | 7/2004 | Amiri et al. | 707/1 |
| 2004/0133591 | A1* | 7/2004 | Holenstein et al. | 707/102 |
| 2004/0215883 | A1* | 10/2004 | Bamford et al. | 711/129 |
| 2005/0187977 | A1* | 8/2005 | Frost | 707/104.1 |
| 2005/0283658 | A1* | 12/2005 | Clark et al. | 714/11 |

OTHER PUBLICATIONS

Cheriton, D.R., H.A. Goosen and P.D. Boyle "ParaDiGM: A Highly Scalable Shared-Memory Multi-Computer Architecture", Report No. STAN-CS-90-1344, Stanford University, Department of Computer Science, Nov. 1990.*

Rys, M. and G. Weikum "Heuristic Optimization of Speedup and Benefit/Cost for Parallel Database Scans on Shared-Memory Multiprocessors", Proceedings of the Eighth International Parallel Processing Symposium, Apr. 26-29, 1994, pp. 894-901.*

Mohan, C., H. Pirahesh, W.G. Tang and Y. Wang "Parallelism in Relational Database Management Systems", IBM Systems Journal, vol. 33, No. 2, 1994, pp. 349-371.*

Brinkhoff, T., H-P. Kriegel and B. Seeger "Parallel Processing of Spatial Joins Using R-trees", Proceedings of the 12th International Conference on Data Engineering, Feb. 26-Mar. 1, 1996, pp. 258-265.*

Nick, J.M., J-Y. Chung and N.S. Bowen "Overview of IBM System/390 Parallel Sysples—A Commercial Parallel Processing System", Proceedings of the 10th International Parallel Processing Symposium (IPPS '96), Apr. 15-19, 1996, pp. 488-495.*

Hallmark, G. "Oracle Parallel Warehouse Server", Proceedings of the 13th International Conference on Data Engineering, Apr. 7-11, 1997, pp. 314-320.*

Ronström, M. "Design and Modelling of a Parallel Data Server for Telecom Applications", PhD Thesis, Linköping, University, Dissertation No. 520, 1998.*

Sokolinsky, L.B. "Choosing Multiprocessor System Architecture for Parallel Database Systems", Proceedings of the Workshop on Computer Science and Information Technologies (CSIT'2000), Ufa, Russia, 2000.*

Jones, J. "Not-So-Silent Strengths of DB2 Universal Database: An Examination of the Strengths of the IBM DB2 Family", IBM Corporation, Apr. 2001.*

Lahiri, T., V. Srihari, W. Chan, N. Macnaughton and S. Chandrasekaran "Cache Fusion: Extending Shared-Disk Clusters with Shared Caches", Proceedings of the 27th VLDB Conference, 2001.*

Sokolinsky, L.B. "Organization of Parallel Query Processing in Multiprocessor Database Machines with Hierarchical Architecture", Programming and Computer Software, vol. 27, No. 6, 2001, pp. 297-308.*

Oracle "Oracle9i Real Application Clusters Concepts, Release 1 (9.0.1)", Part No. A89867-02, Chapter 5.*

DeMel, S., M. Holt and M. Bauer "Oracle9i Real Application Clusters: Cache Fusion Delivers Scalability", Oracle White Paper, Feb. 2002.*

Josten, J., C. Cotner and C. Young "DB2 for zSeries on Parallel Sysplex: Your Key to Application Availability, Scalability and High Performance", white paper, Aug. 2002.*

Chandrasekaran, S., B. Kehoe, V. Buch, M. Bauer, R. Greenwald, G. Lumpkin and M. Reddy "Technical Comparison of Oracle9i Real Application Clusters vs. IBM DB2 UDB EEE v8.1", white paper, Oct. 2002.*

Chandrasekaran, S. and R. Bamford "Shared Cache—The Future of Parallel Databases", Proceedings of the 19th International Conference on Data Engineering (ICDE'03), 2003, pp. 840-850.*

DeWitt, D.J., S. Madden and M. Stonebraker "How to Build a High-Performance Data Warehouse", downloaded from db.lcs.mit.edu/madden/high_perf.pdf, 2006.*

Adam, R. N.; Tewari, R.:"Regeneration with Virtual Copies for Replicated Databases", 1991, IEEE, p. 429-436, CH2996-7/91/0000/0429.

Teuhola, J.:"Deferred Maintenance of Replicated Objects in Single-Site Databases", 1996, IEEE, p. 476-481, 0-8186-7662-0/96, and no more.

* cited by examiner

METHOD USING VIRTUAL REPLICATED TABLES IN A CLUSTER DATABASE MANAGEMENT SYSTEM

BACKGROUND OF THE INVENTION

1. Field of the Invention

This invention relates in general to database management systems performed by computers, and in particular to a method using virtual replicated tables in a cluster database management system.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

A typical relational database management system includes both database files and index files. The database files store data in the rows and columns of tables stored on data pages. A page is a physical unit of transfer between main storage and secondary storage. In such a table, the rows may correspond to individual records while the columns of the table represent attributes of the records. For example, in a customer information table of a database management system, each row might represent a different customer data object while each column represents different attributes of the customers, such as the name of a particular customer, the amount owed by the customer and the cash receipts received from the customer. The actions of a transaction that cause changes to recoverable data objects are recorded in a log.

Replicated tables play an important role in cluster database systems. They are used to improve performance by co-locating data on nodes where they will be frequently accessed. Unfortunately, actually replicating data results in significant extra overhead during insert/update/delete (data modification) operations and it increases administration complexity and cost due to the required extra storage. As a result of those implications replicated tables are not always practical, particularly in On-line Transaction Processing System (OLTP) scenarios. Competitive cluster technologies, such as full shared-cache cluster technology, do not have the same undesirable characteristics as replicated tables but bring some other problems, such as increased cost, lock contention and high messaging overhead and they operate at the granularity of a whole database and not on table or record level.

Therefore, instead of replicating data in cluster database management systems the present invention defines and uses virtual replicated table architecture which retains the benefits of traditional replicated tables but eliminates the negative side-effects.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a computer-based method for improved data sharing within a cluster of nodes having a database management system. The method defines a virtual replicated table as being useable in a hybrid of a shared-cache and shared-nothing architecture. The virtual replicated table is a physically single table sharable among a plurality of cluster nodes for data read operations and not sharable with other cluster nodes for data modification operations. Default owner node is assigned for each virtual replicated table to ensure the page validity and provide requested pages to the requesting node. Read operation on the virtual replicated table data is executed in a shared-cache mode in the local node using a local buffer cache and for each requested page it performs lock synchronization, caching pages from the virtual replicated table into the local buffer cache, retrieving data from the page and cleanup and page unlocking. Modification operation on the virtual replicated table data is executed in a shared-nothing mode and is shipped to and executed in the owner node using a local buffer cache in shared-nothing algorithm. For each requested page it performs lock synchronization, caching pages from the virtual replicated table into the local buffer cache, retrieving and modifying data from the page, and cleanup and page unlocking. Page-cache locks (P-Locks) are used for locking of index and internal system pages across the cluster nodes, releasable prior to operation completion when the protected page consistency is guaranteed across the cluster.

Another preferred embodiment of the present invention is a system implementing the above-mentioned method embodiment of the present invention.

Yet another preferred embodiment of the present invention includes a computer usable medium tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings, which form the part thereof, and in which are shown by way of illustration specific embodiments in which the invention may be practiced. It is to be understood that other embodiments may be utilized and structural and functional changes may be made without departing from the scope of the present invention.

The present invention discloses a method using virtual replicated tables in a cluster database management system.

Figure 1:
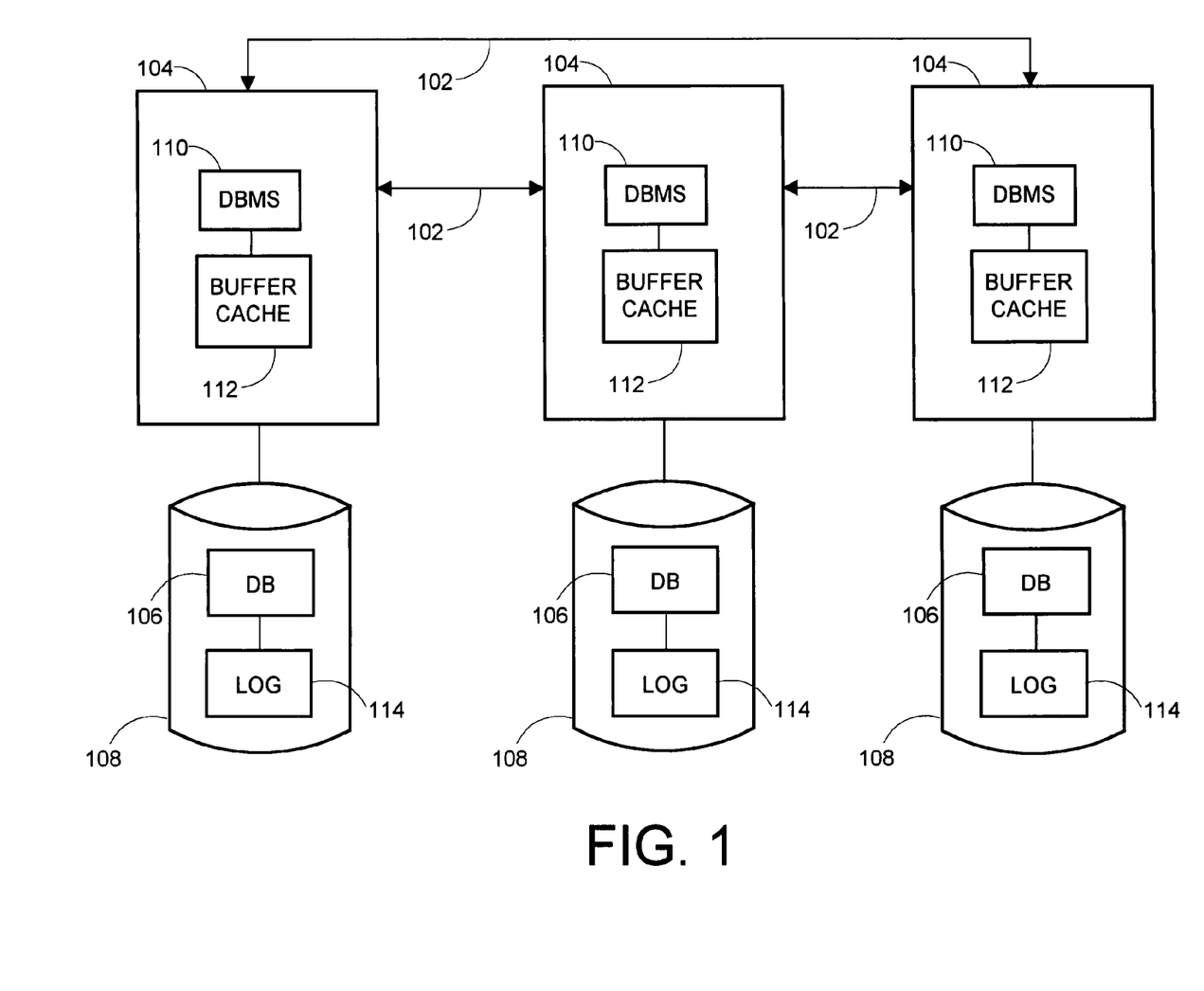
FIG. 1 schematically illustrates an exemplary computer hardware and software environment usable by the preferred embodiments of the present invention.

FIG. 1 schematically illustrates an exemplary computer hardware and software cluster environment usable by the preferred embodiments of the present invention. A typical cluster environment includes multiple computer systems (nodes) and uses a network 102 to connect these independently-operated nodes 104 among themselves. Each node 104 has a DBMS 110, providing access to at least one database 106 stored on a local storage system 108, at least one database log 114 used during recovery processes to ensure database transactional integrity, and a memory containing a buffer cache structure 112, used for retaining copies of recently accessed pages. Each node 104 runs application programs and has a conventional processor executing instructions stored in an associated computer memory and a computer system terminal and other conventional features, well known in the art and thus not shown in FIG. 1. The network 102 may include LANs, WANs, SNA networks, Internet and the like and is used for data and message transmission. Data transmission may be performed between the disk system 106 and each of the nodes 104, and between the nodes 104, through network 102 signal lines arranged therebetween. A typical combination of resources may include nodes 104 that are implemented on personal computers, workstations, minicomputers or mainframes.

Each storage system 108 stores one or more relational databases and may include optical disk drives, magnetic tapes and/or semiconductor memory. Each storage device permits receipt of a computer usable medium, such as a magnetic media diskette, magnetic tape, optical disk, semiconductor memory and other machine-readable storage device, and allows for program instructions and data, recorded on the computer usable medium, to be read and transferred into the computer memory. The recorded program instructions may include the code for the method embodiment of the present invention. Alternatively, the program steps can be received into the operating memory from a computer over the network.

Operators of the node computer system 104 terminal use a standard operator terminal interface, not shown, to transmit electrical signals to and from the node computer system 104, that represent commands for performing various tasks, such as search and retrieval functions, named queries. Data storage and retrieval is accomplished with queries against a database stored on the local storage system 108. In the present invention, these queries conform to the Structured Query Language (SQL) standard, and invoke functions performed by a DataBase Management System (DBMS) 110, such as a Relational DataBase Management System (RDBMS) software, located in each node 104. In the preferred embodiments of the present invention, the RDBMS software is the Version 8 of the DB2 product, offered by IBM for the z/OS, AS400, OS390, or OS/2 operating systems, the Microsoft Windows operating systems, or any of the UNIX-based operating systems supported by the DB2. Those skilled in the art will recognize, however, that the present invention has application to any RDBMS software that uses SQL, and may similarly be applied to non-SQL queries and to non-relational databases. The method and system of the present invention may be used in a localized or distributed computing environment in which two or more computer systems are connected by a network, such as World Wide Web, including environments in which the networked computers are of different type.

Of course, those skilled in the art will recognize that many modifications may be made to this configuration without departing from the scope of the present invention. In addition, those skilled in the art will recognize that any combination of the above components, or any number of different components, including different computers, computer programs, peripherals, and other devices, may be used to implement the present invention, so long as similar functions are performed thereby.

Present invention defines and uses novel virtual replicated tables located in databases 106 on the local storage system 108. A virtual replicated table is physically a single table that is shared for read operations in shared-cache mode by multiple nodes and each node is able to cache pages from that table into its buffer cache 112. Thus, read operations are always executed in the local node 104 which requested the operation. A simplified cache coherency algorithm is used to ensure that database isolation semantics are enforced for all operations only on virtual replicated tables and not on the whole cluster. Insert/update/delete operation access to the virtual replicated tables operates in shared-nothing mode as these tables are not shared among the cluster nodes 104 and traditional function shipping is used to perform these operations on a table or record level on the owner node 104. Remaining tables, not declared as virtual replicated tables, use traditional shared-nothing methods for read operations as well as for insert/update/delete operations. Prior to use virtual replicated tables have to be declared with a virtual replication attribute. Tables chosen to be declared this way are often tables that are difficult to partition and/or recommended by advisors and wizards. The virtual replication attribute allows the optimizer to recognize these tables appropriately in order to generate appropriate local query execution plans, as it does conventionally with replicated tables.

Thus, the present invention operates in a hybrid using the shared-cache and shared-nothing architectures. In the present invention the local buffer cache 112 is fully utilized for read intensive operations, retaining one of the key benefits that the shared-cache architecture enables. At the same time the concept of a data owner node is maintained and all insert/update/delete operations can only be performed on that node which simplifies insert/update/delete and transaction recovery, retaining one of the key benefits of the shared-nothing architecture. In each cluster many tables can be defined as a virtual replicated table and in the same cluster other tables may be defined as partitioned or non-partitioned and operations against those partitioned and non-partitioned tables are implemented with normal shared-nothing architecture algorithms.

By retaining the shared-nothing properties for insert/update/delete operations the preferred embodiments of the present invention eliminate many of the complications of shared-cache architecture that are a result of dynamic ownership of data. Thus, the present invention simplifies transaction recovery and enhances performance by eliminating the potential thrashing of modified data blocks across different nodes 104 that shared-cache systems suffer from. In the present invention only one buffer cache 112 and only one log 114 can possibly have contaminated data in it.

Use of traditional shared-nothing function shipping for all insert/update/delete operations allows keeping the shared-nothing concept of data ownership and enables re-use of the shared-nothing algorithms for those operations. Moreover, in the present invention the owner node 104 ensures that any cached copies are updated or appropriately invalidated. Furthermore, the system assigns a default ownership node 104 for each virtual replicated table and balances the load of table owners across the nodes 104 of the cluster.

The present invention uses a simplistic insert/update/delete (IUD) algorithm for record and table modification operations that relies on a single, static node 104 for implementing the IUD operations, unlike the complicated dynamic shared-cache architecture mechanisms. For both read and insert/ update/delete operations the present invention may also require use of an index and internal system page which requires a lock named page-cache lock (P-Lock), prior of page modification. This ensures that locking of index and internal system pages, when needed, can occur across multiple nodes 104 while maintaining buffer cache 112 coherency of index pages and other DBMS internal system pages, as is traditionally implemented in shared-cache systems. However, the management of the P-Lock for index and system internal pages is implemented in the present invention with the same simplistic locking algorithm used for a regular transaction lock (TX-Lock). Here, however, P-Lock use is not strictly transactional because it can be released prior to transaction completion as long as the protected page is guaranteed to be consistent across the cluster.

In the present invention the basic algorithm of code execution requires that read operations are always executed in the local node 104 and for them only local transaction TX-Locks and local P-Locks are required. Thus, the optimizer must recognize virtual replicated tables as such and generate appropriate query execution plans, as it does conventionally with replicated tables. Insert/update/delete operations are always executed according to traditional function-shipping to the data owner node 104. For these operations the code execution path is adapted to obtain appropriate locks across the cluster, on a table or record level, to ensure that proper database isolation semantics are maintained. Thus, these operations require global locks on all cluster nodes 104 with the first lock being obtained on the owner node 104. The locks on the other nodes 104 can be obtained in any order and several optimization aspects are possible. No new mechanisms are required beyond conventional methods, and they include handling of responses which may be temporarily blocked by read activity and deadlock detection.

Additionally, the buffer cache 112 manager is improved with page invalidation during write operations and locking when bringing pages into the buffer cache 112. Buffer cache management is performed according to simple rules to ensure consistent images across the cluster. If a page is located in the local buffer cache 112 then it is known as always valid and no page invalidation within buffer cache 112 is necessary. If a page is not located in the local buffer cache 112, a page needs to be brought into the buffer cache 112. If the page owner is the current node 104 a page is read directly from the storage system 108 disk. If the page owner is a different node 104 then it is possible that the owner node 104 has a contaminated version of that page in its buffer cache 112 and there are two preferred embodiments of the present invention. In one preferred embodiment two asynchronous messages are sent to the owner node 104. One message requests the owner node 104 to retrieve that page from its buffer cache 112, if it already exists in the buffer cache 112. The other message requires the I/O subsystem to retrieve the data from the storage system 108 disk. If the reply message from the owner node 104 to the first request states that the page already exists in its buffer cache 112, then the request to the I/O system is discarded and the local buffer cache 112 is populated with the page from the owner node buffer cache 112. Otherwise, the I/O request is honored and used to populate the local buffer cache 112 from the owner node storage system 108.

Another, simpler embodiment sends only an I/O request to the owner node 104. The owner node 104 first checks its buffer cache 112 because the hit ratio of that buffer cache 112 lookup is probably high enough that it will likely be in the cache resulting in good overall performance. Otherwise, the owner node 104 creates an I/O request used to populate the owner buffer cache 112 from the owner node storage system 108. The owner node then sends the buffer page to the local node.

Page invalidation within buffer cache 112 is performed differently for two different cases. One aspect performs page invalidation within buffer cache 112 for transactional data and another aspect performs page invalidation for index and system internal pages. For transactional data page invalidation within buffer cache 112 occurs on transaction completion. For index and system internal pages locking with P-Locks requires a lock synchronization across the cluster and page invalidation within buffer cache 112 preferably occurs as soon as the page is known to be consistent, which is usually as soon as the page modification has occurred. Because the index and system internal pages are locked across the cluster, it is important to free the previously acquired P-Locks as soon as possible so that read operations can proceed. Thus, the locks must be released and read-copies of those pages discarded (removed) from the cache and page refreshed with the current data. In one aspect page invalidation within buffer cache 112 is forced at the completion of page update, when the page is unpinned locally. In another aspect of the invention page invalidation within buffer cache 112 can occur asynchronously.

Because modification (IUD) operations are all performed on the same, owner node 104, this algorithm does not introduce any new blocking operations. Transactional data pages need to be locked with local transaction TX-Locks and globally consistent at transaction commit, used to release the locks. Any transaction that has modified a page must ensure its consistency. One aspect of the present invention uses a global transaction manager to ensure buffer caches consistency. The list of affected pages is transmitted so that they could be invalidated. Alternatively, the new pages may be pushed along or have to be pulled.

The preferred embodiments of the present invention perform page invalidation within buffer cache 112 on IUD lock release. Because each node 104 knows whether it is the owner for a given update lock, if it is not the owner then the page containing that record must be invalidated. The page number is derived from the lock information and no new message transfer or synchronization is required across the cluster. In some situations page invalidation within buffer cache 112 needs to occur on update, such as when b-tree pages are modified (splits, etc). Alternative invalidation embodiments invalidate on insert/update/delete operation or invalidate on buffered commit used to release the locks.

One of the most complicated areas for clustered systems is dealing with node failures. The more components there are in a system, the more opportunities for failure exist and understanding the design points for dealing with those failures is important. The present invention introduces a simple lock management, because it maintains the data ownership concept, which means that failure of a node will result in the inability to perform insert/update/delete operations on that data until the node recovers or fails over. Additionally, any outstanding global locks must be maintained until that node recovers. The recovery algorithm is enhanced to remove all global locks during undo processing of the outstanding transactions at the time of the failure. If a node fails then on recovery it must obtain the list of outstanding global locks prior to allowing access to the node. Similarly, for any new node being added to the cluster the list of all outstanding global locks must be obtained. Each node is capable of tracking global locks and able to determine if it is the originator and controller of those locks, when the locks are for the modification operations, and for which of those locks it is only the participant and simply reading data protected by those locks. The present invention also has recovery procedures for node failure during buffer cache 112 population, addition of new data node online and transfer of ownership of data.

In implementation, the virtual replicated tables are declared as such during table creation. The storage system 108 volumes for the virtual replicated table are declared visible across all its data nodes 104.

One possible syntax for virtual replicated table creation would be a definition of such a table at a table creation time using a SQL statement such as:
CREATE TABLE (<column definitions>) VIRTUAL REPLICATED Performance of the preferred embodiments of the present invention is much better than in conventional systems, such as the ones using traditional replicated tables. Read performance is optimized and comparable to shared-cache architecture performance. Because in the present invention there is no distributed lock management (DLM) and no page invalidation within buffer cache 112 on read operations this further helps read performance. Because a single application that performs both read/write on the same pages may incur page invalidations in buffer cache 112 when the application is not located on the owner node 104 this hurts performance relative to true shared-cache implementation and in these cases it may be better to partition these tables and use a pure shared-nothing approach which should outperform shared-cache architecture since no buffer cache 112 synchronizations will occur.

Insert/update/delete performance is generally less efficient due to extra messages required for locking which scales with the number of nodes 104 since this algorithm requires a broadcast to all nodes 104. This performance is also impacted by the needed page invalidation within buffer cache 112. On the positive side, there is no possibility for thrashing ownership of a data block nor are there any issues with multiple nodes 104 having to write the same data block which makes the present invention more efficient. Some of the traditional complexity of dealing with insert/update/delete operations has been simplified by leveraging the shared-nothing function shipping model.

The performance improvements are quite dramatic for many workloads compared to the traditional replicated table systems and the performance advantage is close to that of conventional shared-cache architecture performance at a fraction of the implementation cost. Because in the preferred invention shared-cache architecture works in conjunction with shared-nothing architecture it allows any given configuration to leverage the benefits of shared-nothing architecture, while using shared-cache technology for the cases where a shared-nothing system performs less optimally. Further advantage of the present invention is implementation simplification and avoidance of costly and complex scenarios regarding log 114 recovery and thrashing that can occur when multiple nodes 104 are allowed to write pages to storage system 108.

Figure 2A:
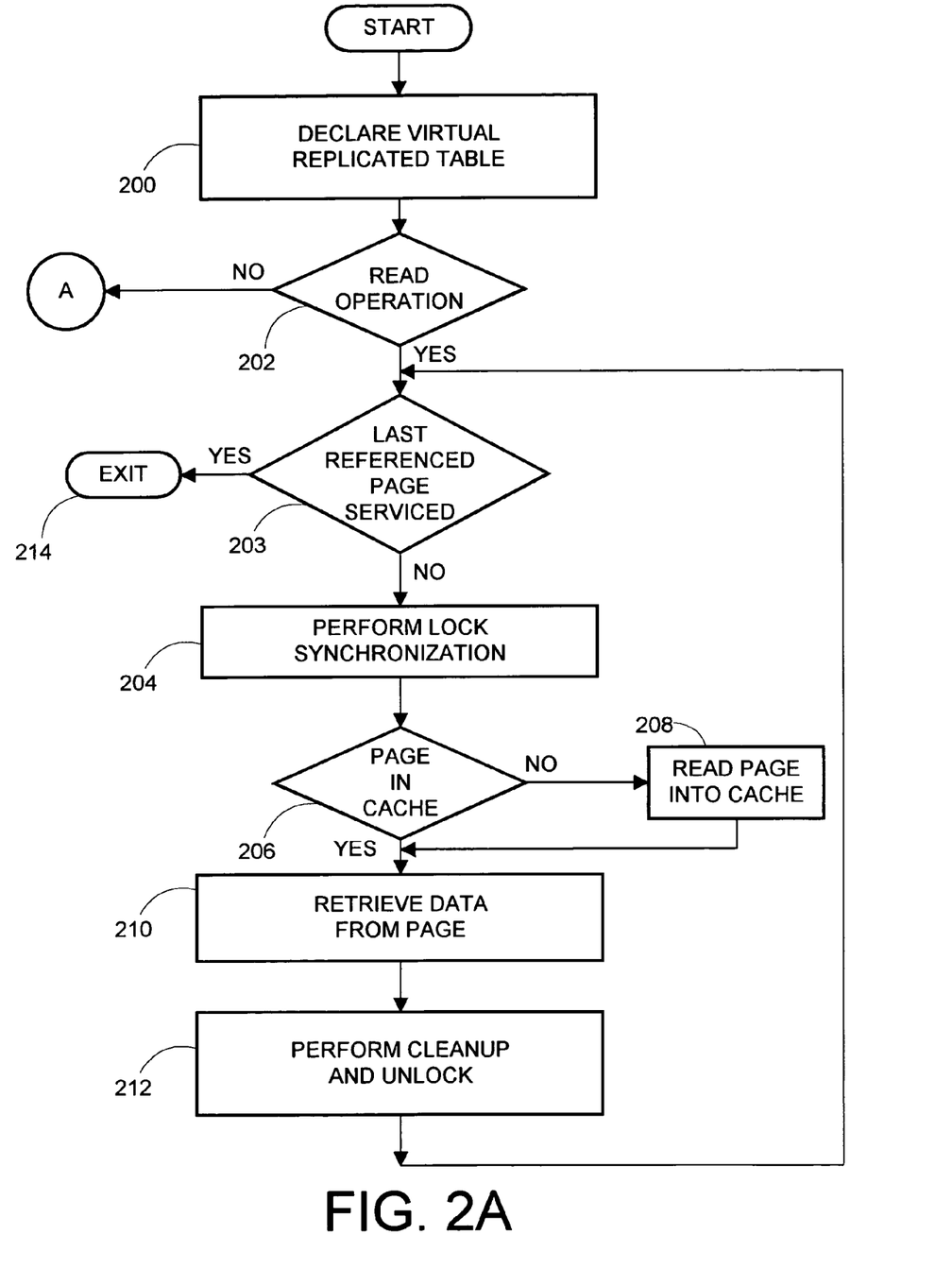
FIG. 2A and FIG. 2B illustrate a flowchart of a procedure honoring requests to read and modify records from virtual replicated tables, according to the preferred embodiments of the present invention.
Figure 2B:
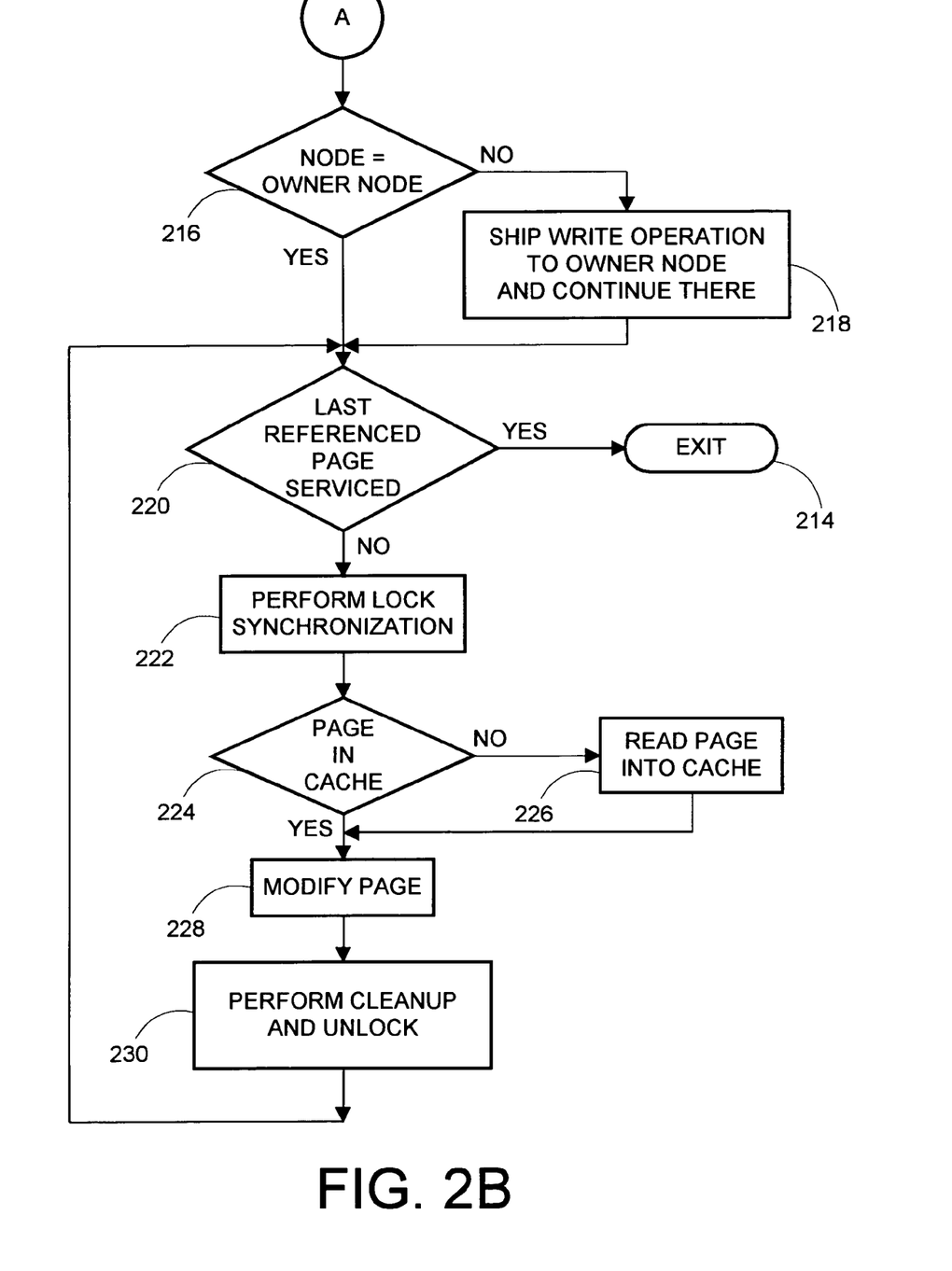

FIG. 2A and FIG. 2B illustrate a flowchart of a procedure honoring requests to read and modify records from virtual replicated tables, according to the preferred embodiments of the present invention. Step 200 shows that a virtual replicated table has to be declared as such with all its attributes. Step 202 determines whether a request is a read operation. For read operations in step 203 it is determined whether the last referenced page got serviced and if so the procedure exits in step 214. Otherwise, the procedure loops to obtain all referenced pages. In step 204 a lock synchronization is performed, according to the routine described below in reference to FIG. 3. If step 206 determines that page is not in cache the page is read into the cache in step 208, according to the buffer cache management routine of FIG. 5A and FIG. 5B. Next, in step 210 the record data are retrieved from the page, step 212 performs cleanup and unlocking in step 212, described below in reference to FIG. 4A and FIG. 4B, and the loop continues in step 203.

For a modification operation (UD) the procedure tests, in step 216, whether the local node is the owner node and, if not, in step 218 the operation is shipped to the owner node and all remaining operation steps 220-230 are performed on the owner node. Step 220 tests whether the last referenced page got serviced and, if so, the procedure exits in step 214. Otherwise, in step 222 the control is transferred to the lock synchronization routine of FIG. 3. Next, step 224 checks whether the page is in the buffer cache and, if not, in step 226 it is read into the buffer cache, according to the buffer cache management routine of FIG. 5A and FIG. 5B. Then, step 228 modifies the page, step 230 invokes the cleanup and unlocking routine of FIG. 4A and FIG. 4B and the loop continues in step 220.

Figure 3:
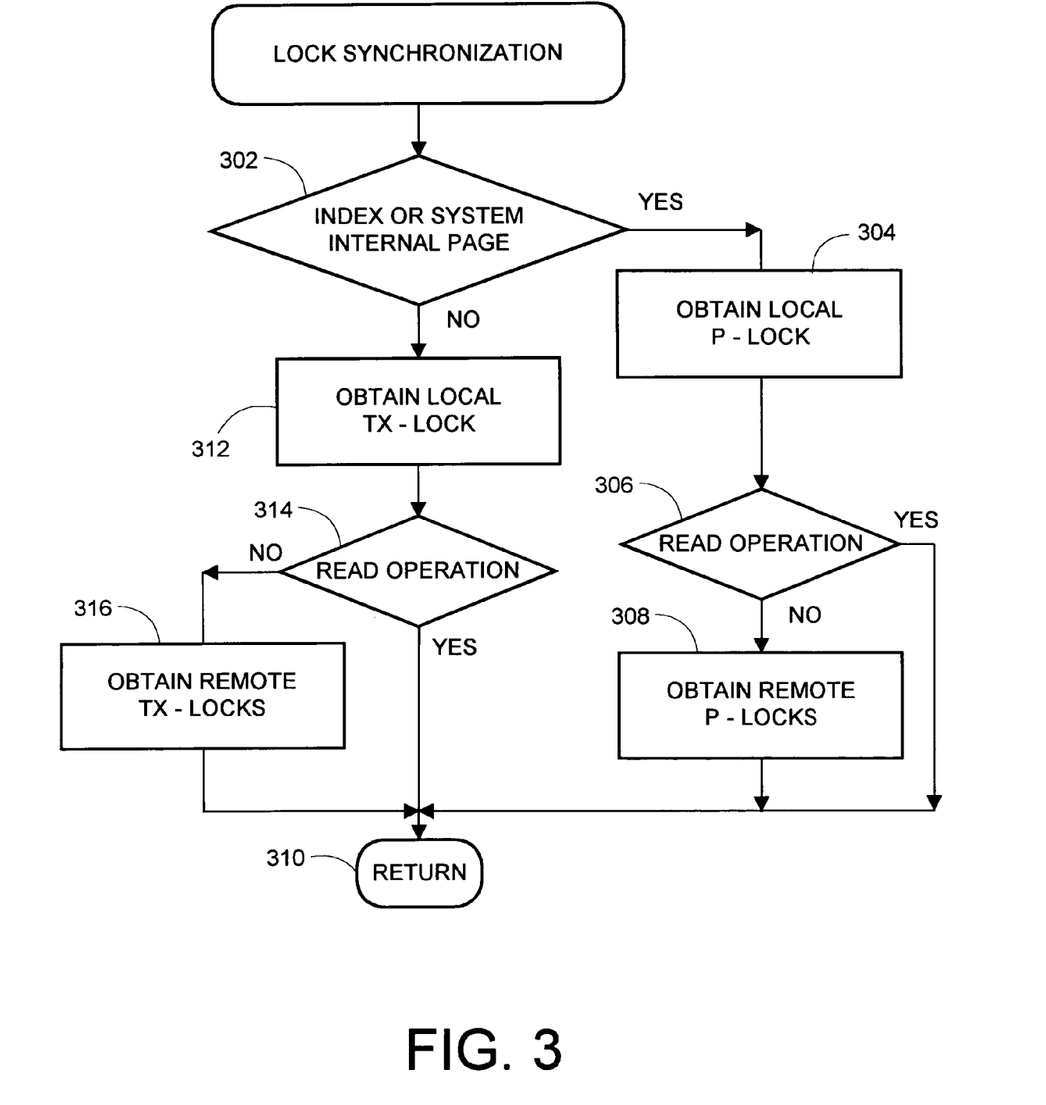
FIG. 3 illustrates a flowchart of a procedure performing lock synchronization, according to the preferred embodiments of the present invention.

FIG. 3 illustrates a flowchart of a procedure performing lock synchronization, according to the preferred embodiments of the present invention. Step 302 determines whether it is an index or system internal page and, if so, step 304 obtains a local P-Lock. Next, if step 306 determines that it is a read operation, the routine returns in step 310. Otherwise, in step 308 remote P-Locks are obtained and routine returns in step 310. If in step 302 it is determined that this is a transactional page, in step 312 a local TX-Lock is obtained. If step 314 determines that this is a read operation, the routine returns in step 310. If not, in step 316 remote TX-Locks are obtained and routine returns in step 310.

Figure 4A:
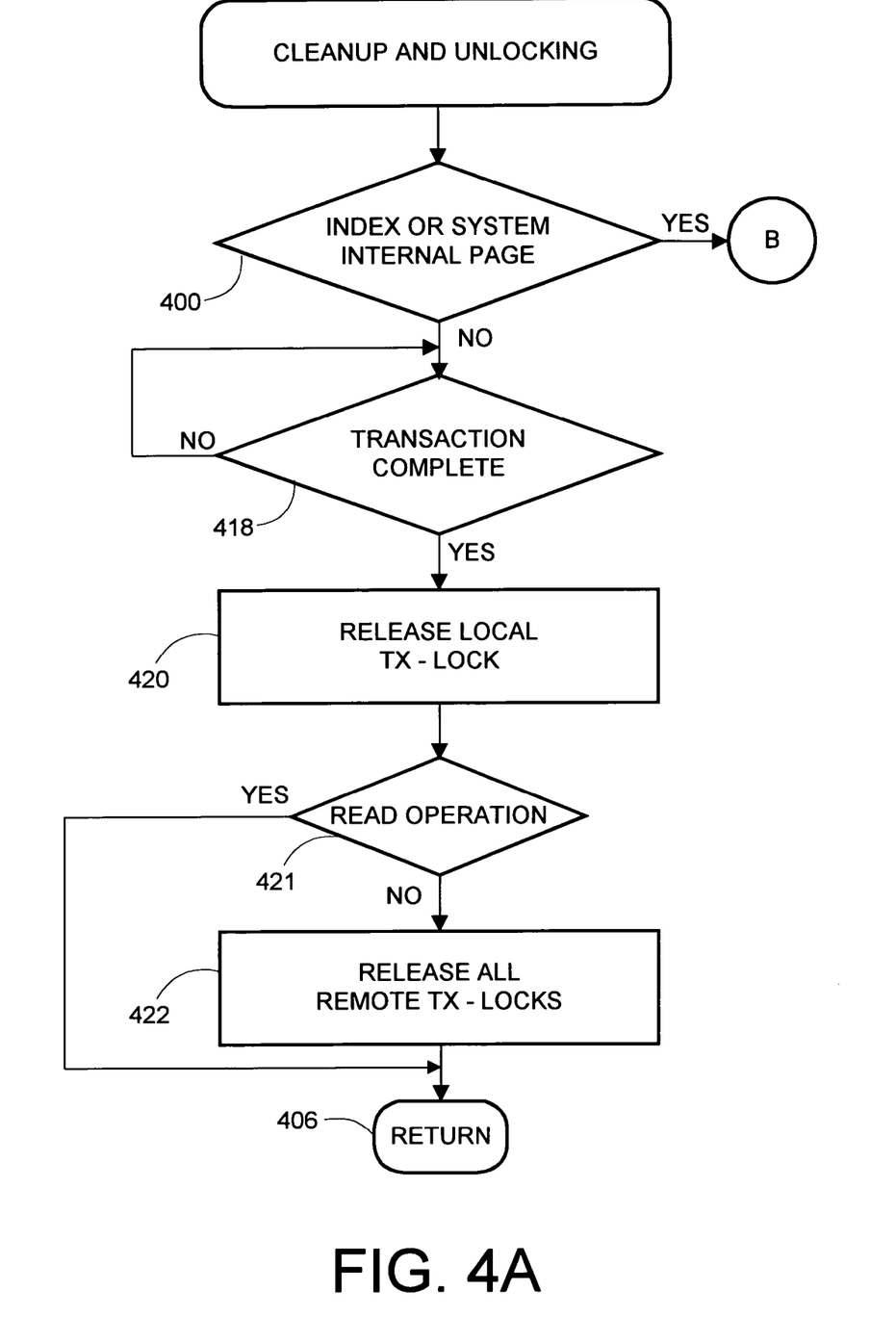
FIG. 4A and FIG. 4B illustrate a flowchart of a procedure performing cleanup and unlocking, according to the preferred embodiments of the present invention.
Figure 4B:
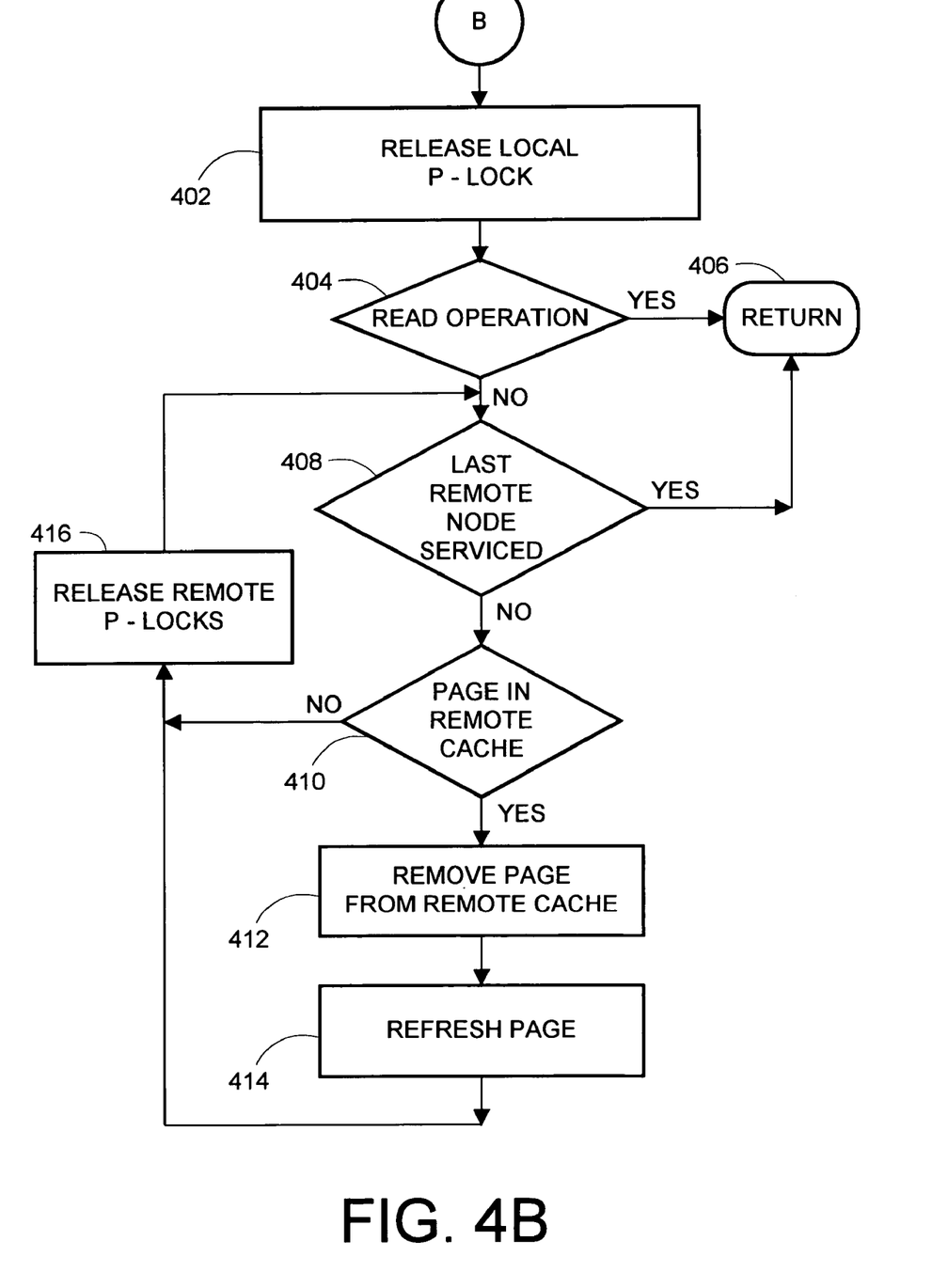

FIG. 4A and FIG. 4B illustrate a flowchart of a procedure performing cleanup and unlocking, according to the preferred embodiments of the present invention. Step 400 tests whether the page is index or system internal page. If so, in step 402 the local P-Lock is released and in step 404 it is tested whether it is a read operation. If so, the routine returns in step 406. If it is not a read operation but a modification operation, the routine loops until step 408 detects that the last remote node got serviced and returns in step 406. Otherwise, step 410 tests whether the page is located in remote cache and, if not, in step 416 remote P-Locks are released and the loop continues in step 408. If the page is in the remote buffer cache in step 412 the page is removed from that buffer cache and in step 414 the page is refreshed, the remote P-Locks are released in step 416 and loop continues in step 408. If in step 400 it was determined that it is a transactional page and not an index or system internal page the routine waits until step 418 determines that this transaction is complete. When the transaction is complete step 420 releases the local TX-Lock. If step 421 determines that it is a read operation the routine returns in step 406. If not, step 422 releases all remote TX-Locks and routine returns in step 406.

Figure 5A:
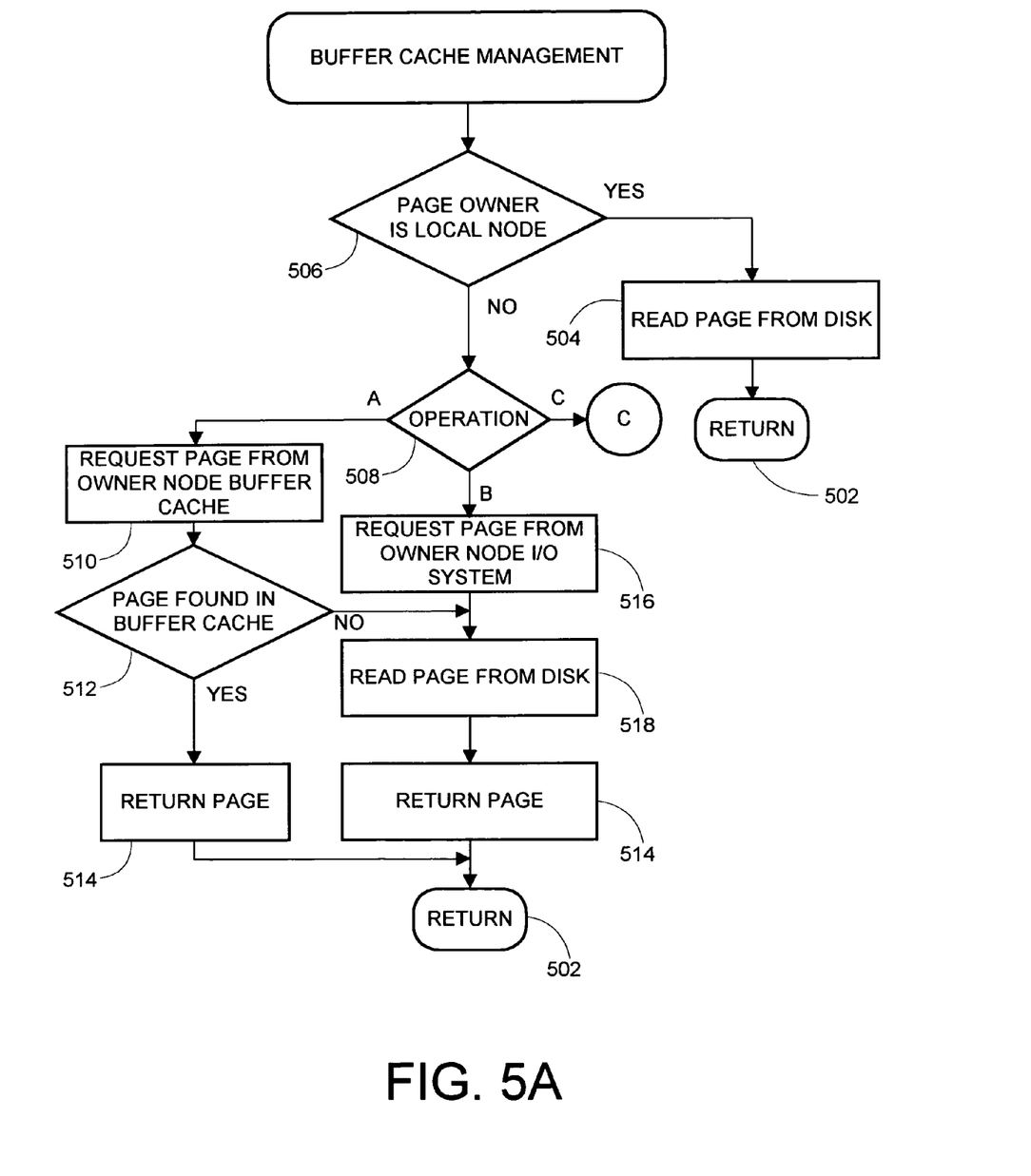
FIG. 5A and FIG. 5B illustrate a flowchart of a procedure performing buffer cache management, according to the preferred embodiments of the present invention.
Figure 5B:
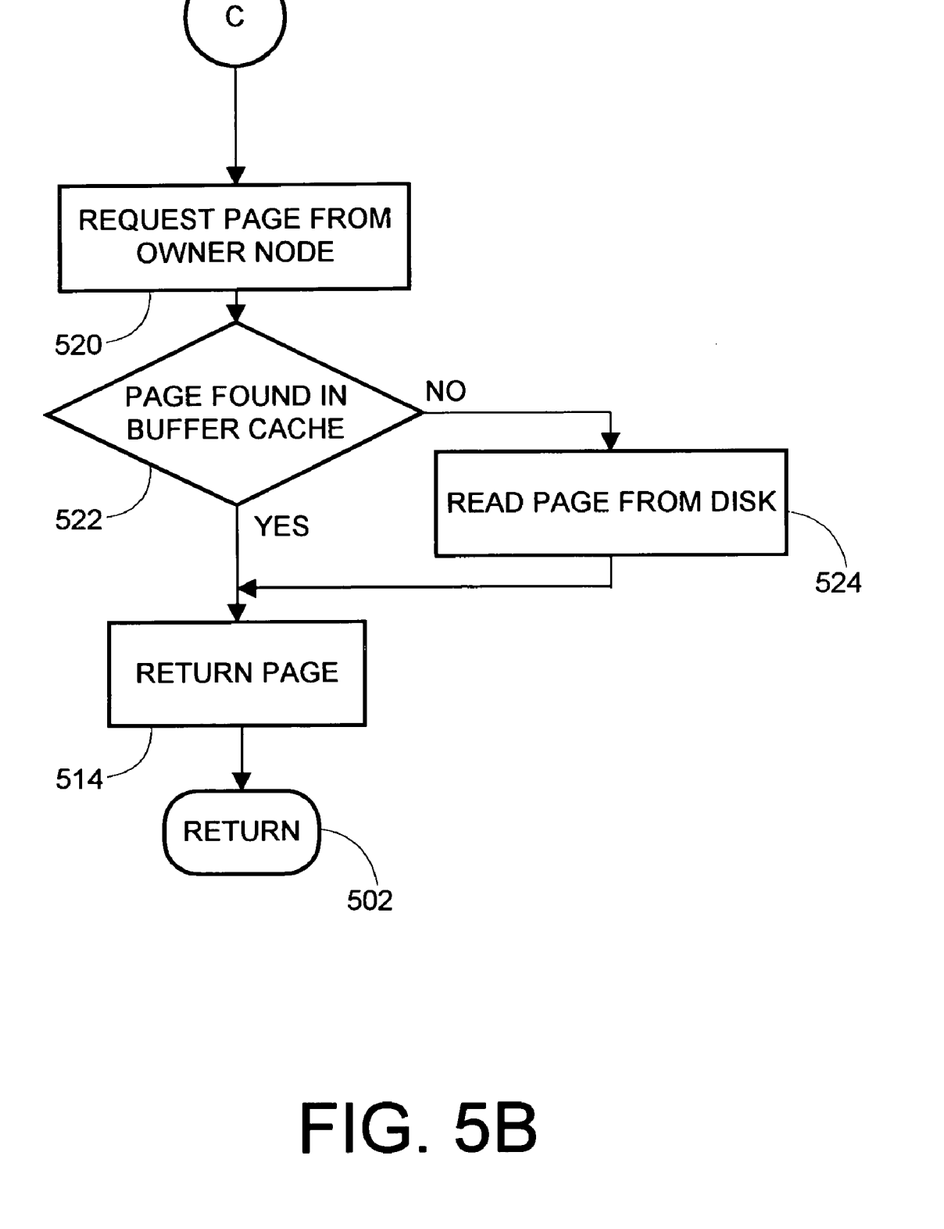

FIG. 5A and FIG. 5B illustrate a flowchart of a procedure performing buffer cache management, according to the preferred embodiments of the present invention. In step 506 the routine tests whether the page owner is the local node. If so, the page is read from the storage system (disk) in step 504 and the procedure returns in step 502. If the page owner is not the local node, two possible aspects can be selected at step 508 and used with the present invention. In the first aspect operation A is performed in step 510 to request the page from its owner node buffer cache, and operation B is performed in step 516 to request the page from the owner node I/O system. If step 512 confirms that the page is found in buffer cache the page is returned in step 514 and routine returns in step 502. If not, owner node I/O system obtains the page from the storage system in step 518, page is returned in step 514 and routine returns in step 502. Alternatively, operation C is performed at step 508 and the page is requested from the owner node in step 520. Owned node first checks, in step 522, whether the page is located in its buffer cache and if not it reads the page from the storage system in step 524. The page is returned in step 514 and routine returns in step 502.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for improved data sharing within a cluster of nodes having a database management system, the method comprising:

defining a virtual replicated table in the database management system, the virtual replicated table useable in a hybrid of a shared-cache and shared-nothing architecture and comprising a physically single table sharable among a plurality of cluster nodes for data read operations and the physically single table being not sharable with other cluster nodes for data modification operations;

performing a read operation on virtual replicated table data in a shared-cache mode in a local node using a local buffer cache, the read operation for each requested page performing lock synchronization, caching pages from the virtual replicated table into the local buffer cache, retrieving data from the page, and performing cleanup and page unlocking; and performing a modification operation on the virtual replicated table data exclusively in a shared-nothing mode, the modification operation shipped to and executed exclusively in the owner node using a local buffer cache in a shared-nothing algorithm and performing lock synchronization, caching pages from the virtual replicated table into the local buffer cache, retrieving and modifying data from the page, and performing cleanup and page unlocking.

2. The method according to claim 1, further comprising ensuring that records of the virtual replicated table are locked for read operations with a local transaction lock (TX-Lock) and modification operations are locked with both local and global TX-Locks across the cluster nodes and wherein the TX-Locks are releasable upon operation completion.

3. The method according to claim 1, further comprising locking index and internal system pages across cluster nodes using a system-level page-cache lock (P-Lock), the system-level page-cache lock releasable prior to operation completion when the protected page consistency is guaranteed across the cluster.

4. The method according to claim 1, further comprising assigning a default owner node for each virtual replicated table wherein the owner node ensures the page validity and provides requested pages to a requesting node.

5. The method according to claim 1, farther comprising defining one or more partitioned tables in a cluster, the cluster comprising one or more virtual replicated tables, operations against the partitioned tables comprising standard shared-nothing architecture operations.

6. The method according to claim 1, farther comprising defining one or more non-partitioned tables in a cluster, the cluster comprising one or more virtual replicated tables, operations against the non-partitioned tables comprising standard shared-nothing architecture operations.

* * * * *